United States Patent [19]

Rozentals

[11] 3,801,171

[45] Apr. 2, 1974

[54] PRELOADING ANTI-FRICTION BEARING ASSEMBLY

[75] Inventor: Alfreds Rozentals, Fairfield, Conn.

[73] Assignee: Heim Universal Corporation, Fairfield, Conn.

[22] Filed: June 30, 1972

[21] Appl. No.: 268,007

[52] U.S. Cl. .............................................. 308/184
[51] Int. Cl. ............................................. F16c 27/00
[58] Field of Search.................. 308/193, 184, 189.1

[56] References Cited
UNITED STATES PATENTS

| | | | |
|---|---|---|---|
| 3,351,398 | 11/1967 | Park et al. ........................... | 308/184 |
| 2,240,285 | 4/1941 | Chamberlin ........................ | 308/184 |
| 2,588,636 | 3/1952 | Korsgren............................. | 308/184 |
| 3,606,502 | 9/1971 | Germond............................. | 308/184 |

FOREIGN PATENTS OR APPLICATIONS 723,399   2/1955   Great Britain...................... 308/184

*Primary Examiner*—Charles J. Myhre
*Assistant Examiner*—Frank Susko

[57] ABSTRACT

A preloaded anti-friction bearing assembly comprising coaxial relatively rotatable inner and outer races, a plurality of balls disposed in spaced relation between said inner and outer races, at least one of said races being radially segmented, said segments being axially displaced with respect to each other, at least one of said segments being preloaded by preloading means to thereby exert a preloading force against said balls, said preloading means including at least one substantially noncompressible, flowable, resilient ring.

10 Claims, 5 Drawing Figures

PRELOADING ANTI-FRICTION BEARING ASSEMBLY

BACKGROUND OF THE INVENTION

This invention relates primarily to preloaded anti-friction bearing assemblies. In particular, the invention disclosed herein relates to ball bearings adapted for use both in high-speed and low-speed bearing applications, in which the bearing involved might encounter misalignment forces, shock loads and the like.

Anti-friction bearings have long been used on a myriad of applications. They have admirably served the design engineer as an effective and efficient means of providing a rotating support. Accordingly, the prior art is highly developed, but certain deficiencies in this general area still continue to exist. The present invention satisfies and fully meets a number of the prior deficiencies of anti-friction bearings. These prior deficiencies or needs can be catalogued generally as the need for the provision of a preloaded anti-friction bearing assembly capable of maintaining constant preload as bearing wear is encountered; capable of being economically manufactured for high-volume commercial applications, capable of being used for high-precision applications involving high-rotational speeds, capable of absorbing shock in various directions without sustaining damage to the various bearing components, capable of being used for applications requiring precise preloading characteristics. One merely has to review the prior art to determine that certain vain efforts have been made to accomplish one or several of the above noted needs.

For example, bulky springs, non-responsive blocks of yieldable material, complex hydraulic and pneumatic preloading systems have all been used without any substantial success.

SUMMARY OF THE INVENTION

It is, therefore, a primary object of the present invention to provide a preloaded, anti-friction bearing assembly which is capable of meeting all of the above noted needs.

In particular, it is an object of the present invention to provide a preloaded anti-friction bearing assembly capable of maintaining constant preload as bearing wear is encountered.

Another object of this invention is to provide a preloaded anti-friction bearing assembly capable of being economically manufactured for high-volume commercial applications.

It is yet another object of this invention to provide a preloaded anti-friction bearing assembly which is capable of being used for high-rotational speeds.

It is still another object of this invention to provide a preloaded anti-friction bearing assembly which is capable of absorbing shock in various directions without sustaining damage to the various bearing components.

It is yet another object of this invention to provide a preloaded anti-friction bearing assembly which is capable of being used for applications requiring precise preloading characteristics.

It is still another object of the present invention to provide a preloaded anti-friction bearing assembly comprising coaxial relatively rotatable inner and outer races, a plurality of balls disposed in spaced relation between said inner and outer races, at least one of the races being radially segmented, the segments being axially displaced with respect to each other, at least one of the segments being preloaded by preloading means to thereby exert a preloading force against the balls, the preloading means including at least one substantially noncompressible, flowable, resilient ring.

Several preferred embodiments of a preloaded anti-friction bearing assembly in accordance with the concept of the present invention are shown by way of example in the accompanying drawings without attempting to show all various forms and modifications in which the invention may be embodied; the invention being measured by the appended claims and not by the details of the following specifications.

DETAILED DESCRIPTION OF THE DRAWINGS

Figure 1:
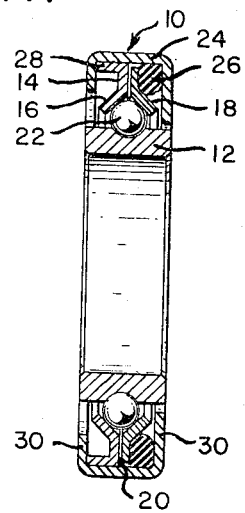
FIG. 1 is a side elevational view in section of a preloaded anti-friction bearing assembly in accordance with the present invention.

A preloaded anti-friction bearing assembly embodying the concept of the present invention is indicated generally by the numeral 10 on the attached drawings and in particular FIG. 1 of the drawings. The preloaded anti-friction bearing assembly 10 is adapted to be inserted on a shaft (not shown) and possibly fitted within and/or supported by some type of housing or surface (also not shown).

The preloaded anti-friction bearing assembly 10 includes a coaxial relatively rotatable inner race 12 and outer race 14. The outer race 14 is radially segmented into two segments 16 and 18. The segments 16 and 18 are axially displaced with respect to each other to define a space therebetween 20. A plurality of balls 22 are disposed in spaced relation between the inner race 12 and the outer race 14 and may be either a full complement of balls or may be held in place by a caging arrangement (not shown). The preloaded anti-friction bearing assembly 10 may also be provided with an outer enclosing ring 24 which encloses the outer race 14.

The outer race segment 18 exerts a preloading force against the balls 22. This force is generated by a substantially noncompressible, flowable, resilient ring 26. The resilient ring 26 may be molded in place within the outer enclosing ring 24 or it may be inserted in place during assembly of the bearing assembly 10. The resilient ring 26 may be manufactured from a range of suitable materials depending upon environment and/or degree of preloading. Examples of materials that could be used to form resilient ring 26 are Buna "N" rubber, polyurethane and the like. It can be seen, therefore, that the resilient ring as contemplated by the present invention will have a "memory" and the resilient ring 20 will seek to assume its original shape or state. By utilizing this phenomenon, the appropriate degree of preloading can be predetermined and preselected depending upon the particular application involved. Additionally, the degree of preloading can be preselected and predetermined by varying the width of the space 20 between the segments 16 and 18 of the outer race 14.

The segments 16 and 18 of the outer race 20 of the preloaded anti-friction bearing assembly 10 have a substantially "Y" cross section in a plane radially of the races 12 and 14 and accordingly the balls 22 will be in line contact with the raceway surfaces of the outer race 14. The balls 22 will be in full race curvature contact with the raceway surfaces of the inner race 12. Additionally, outer race segment 16 is provided with a support extension 28 while outer race segment 14 has no such support extension. Accordingly, the outer race segment 16 through its support extension 28 is held relatively stationary by the outer enclosing ring 24. Conversely, the outer race segment 18 is allowed to float for it is held essentially in operational position by the resilient ring 26. The preloaded anti-friction bearing assembly 10, therefore, is particularly adapted to accommodate substantial degrees of misalignment of the shaft (not shown) with respect to the surface which interfaces with the outer portion of the outer support ring 24, under a typical misalignment situation, the inner race 12 might tend to be skewed with respect to the outer race. The balls 22 would tend to change their point of line contact along outer race segments 16 or 18 depending upon the direction of the misalignment. The resilient ring would dynamically maintain the preload on the outer race segment 18 thus maintaining the overall tolerance of the bearing which will enable the bearing to continue to function efficiently. As before mentioned, the degree of hardness of the resilient ring 26 and the width of the space 20 between the two segments 16 and 18 of the outer race 14 will determine the degree of preloading or "float." A large width and a soft, resilient ring will result in a "soft" bearing assembly and conversely a small space and a hard, resilient ring will result in a relatively "tight" bearing. As mentioned before, the resilient ring 26 may be manufactured from a wide range of suitable materials depending upon environment or degree of preloading desired. Likewise, the remaining components of the preloaded anti-friction bearing assembly 10 including the inner race 12, outer race 14, balls 22, and outer enclosing ring 26 can be manufactured from a variety of materials. For example, the inner race 12 could be machined from stainless steel while the outer enclosing ring could be stamped, also from stainless steel. The outer race segments 16 and 18 of the outer race 14 could be stamped or machined parts and could also be coated with a self-lubricating plastic such as polytetrafluoroethylene. It might be noted that the inner race might also be coated with such a self-lubricating plastic. Assembly of the bearing could also take several forms and the preloaded anti-friction bearing assembly 10 is particularly adaptable to automated, high-volume manufacturing techniques. For example, the inner race 12 could be expanded into place by a pin or other expanding tool to form an integral assembly. The outer enclosing ring summarily could be contracted to form an integral bearing assembly. Also, the outer enclosing ring could be deformed axially about the outer race 14, such as by bending or deforming the legs 30 about and around said outer race 14 including of course the resilient ring 26.

Figure 2:
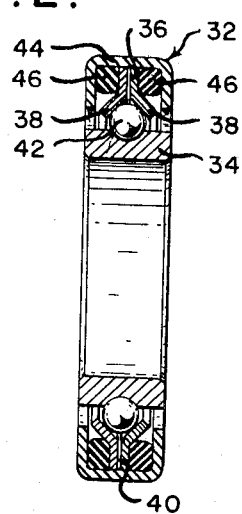
FIG. 2 is a side elevational view in section of another embodiment of a preloaded anti-friction bearing assembly in accordance with the present invention.

Referring now to FIG. 2, there is shown another preloaded anti-friction bearing assembly 32 embodying the present invention. As will be seen by the following description, the main difference between the bearing of FIG. 2 and FIG. 1 is that the FIG. 2 bearing assembly is a double preloaded anti-friction bearing assembly while FIG. 1 bearing is a single preloaded anti-friction bearing assembly.

The preloaded anti-friction bearing assembly 32 includes a coaxial relatively rotatable inner race 34 and outer race 36. The outer race 36 is radially segmented into two identical segments 38. The segments 38 are axially displaced with respect to each other to define a space therebetween 40. A plurality of balls 42 are disposed in spaced relation between the inner race 34 and the outer race 36 and may be either a full complement of balls or may be held in place by a caging arrangement (not shown). The preloaded anti-friction bearing assembly 32 may also be provided with an outer enclosing ring 44 which encloses the outer race 36. The preloaded anti-friction bearing assembly 32 is provided with two identical resilient rings 46. The segments 38 of the outer race 36 have a substantially "Y" cross section in a plane radially of the races 34 and 36 and accordingly, as with the bearing assembly of FIG. 1, the balls 42 will be in line contact with the raceway surfaces of the outer race 36. As mentioned above, the preloaded anti-friction bearing assembly 10 is provided with a single resilient ring 26 and an outer race 14 with one of its segments 16 having a support extension 28. The outer race segments 38 of the preloaded anti-friction 32 have no such support extensions and are therefore allowed to float and they are held essentially in operational position by the resilient rings 46. Thus, the bearing assembly 32 is a double preloaded anti-friction bearing assembly. The above comments concerning material selection and method of assembly concerning bearing assembly 10 are also pertinent to the bearing assembly 32 and need not be repeated. However, it should be noted that the preloaded anti-friction bearing assembly 32 is a relatively "soft" bearing in comparison to the bearing assembly 10 and thus highly suitable for accommodating high degrees of misalignment at relatively low operational loads.

Figure 3:
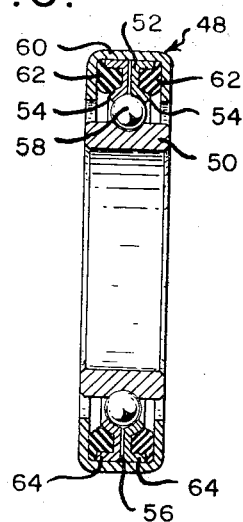
FIG. 3 is a side elevational view in section of yet another embodiment of a preloaded anti-friction bearing assembly in accordance with the present invention.

Referring now to FIG. 3, there is shown another preloaded anti-friction bearing assembly 48 embodying the present invention. As will be seen from the following description, the main difference betwen the bearing of FIG. 2 and FIG. 3 is that the FIG. 3 bearing assembly is provided with a certain amount of radial support and the balls are in full racing curvature contact with the raceway surfaces of the inner and outer races. The preloaded anti-friction bearing assembly 48 includes a coaxial relatively rotatable inner race 50 and outer race 52. The outer race 52 is radially segmented into two identical segments 54. The segments 54 are axially displaced with respect to each other to define a space therebetween 56. A plurality of balls 58 are disposed in spaced relation between the inner race 50 and the outer race 52 and may be either a full complement of balls or may be held in place by a caging arrangement (not shown). The preloaded anti-friction bearing assembly 48 may also be provided with an outer enclosing ring 60 which encloses the outer race 52. The preloaded anti-friction bearing assembly 48 is provided with two identical resilient rings 62. The segments 54 of the outer race 36 have a substantially "T" cross section with a substantially inverted "U"-shaped portion at its base, said section being in a plane radially of the races 50 and 52. Accordingly, and as contrasted to the bearing assemblies 10 and 32 of FIGS. 1 and 2 respectively, the balls 58 will be in full race curvature contact with the raceway surfaces of the inner race 50 and the outer race 52. The bearing assembly 48 is similar to the bearing assembly 32 of FIG. 2 in that it is double preloaded, that is, it is provided with two resilient rings 62. The bearing assembly 48 is different from the bearing assembly 32 in that the identical outer race segments 54 are each provided with a support extension 64. It is to be noted that the support extensions 64 do not extend completely out to the inner sidewall of the outer enclosing ring 60. Accordingly, the outer race segments are provided with a degree of operational support by the support extensions 54 and by the resilient rings 62. Thus, the bearing assembly 48 is a double preloaded anti-friction bearing assembly and is a relatively "tight" bearing as compared to the bearing assembly 32 of FIG. 2. The above comments concerning material selection and method of assemblying concerning bearing assembly 10 are also pertinent to the bearing assembly 48 and need not be repeated. However, it should be noted that the preloaded anti-friction bearing assembly 48 is somewhat of a "compromise" between the bearing assembly 10 of FIG. 1 and bearing assembly 32 of FIG. 2, and is highly suitable for accommodating substantial degrees of misalignment at relatively high-operational loads.

The bearings of FIGS. 1 through 3 are all radial contact bearing assemblies in that the loads are transmitted in a plane substantially radial to the respective races. The preloaded bearing assemblies of FIGS. 4 and 5 are angular contact bearings in that the loads are transmitted in a plane substantially angular to the respective races.

Figure 4:
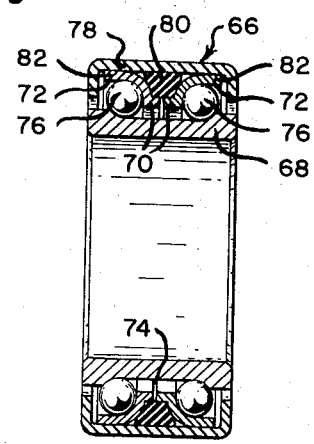
FIG. 4 is a side elevational view in section of still another embodiment of a preloaded anti-friction bearing assembly in accordance with the present invention.

Referring now to FIG. 4, there is shown still another preloaded anti-friction bearing assembly 66 embodying the present invention. As above noted, the main difference between this bearing and the bearing in FIGS. 1 through 3 is that it is an angular contact preloaded anti-friction bearing while the former bearings are radial contact preloaded anti-friction bearings. The preloaded anti-friction bearing 66 includes coaxial relatively rotatable inner race 68 and outer race 70. The outer race 70 is radially segmented into two identical segments 72. The segments 72 are axially displaced with respect to each other to define a space therebetween 74. Two rows of a plurality of balls 76 are disposed in a side-by-side relationship in spaced relation between the inner race 68 and the outer race 70, the inner surface of each segment 70 defining, in part, separate and independent paths for the balls 76. The balls 76 may either be a full complement of balls or may be held in place by a caging arrangement (not shown). The preloaded anti-friction bearing assembly 66 may also be provided with an outer enclosing ring 78 which encloses the outer race 70. The preloaded anti-friction bearing assembly 66 is provided with a single resilient ring 80. The inner race 68 is provided with two raceway surfaces, each of said raceway surfaces respectively defining in conjunction with said segments 72 separate and independent paths for the balls 76. The segments 72 are provided with support extensions 82 which extend out to the inner sidewall of the outer enclosing ring 78; the outer race segments are, therefore, provided with a degree of operational support by the extensions 82 and by the resilient ring 80. Thus the bearing assembly 66 may be described as a single preloaded double or multi-row angular contact bearing. The above comments concerning material selection and method of assembly concerning bearing assembly 10 are also pertinent to the bearing assembly 66 and need not be repeated.

Figure 5:
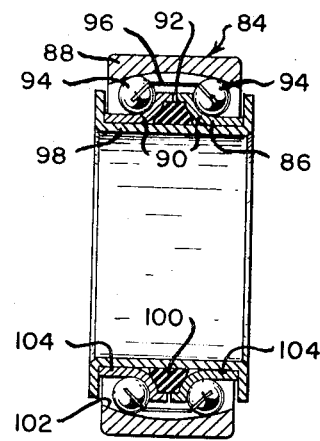
FIG. 5 is a side elevational view in section of yet another preloaded anti-friction bearing assembly in accordance with the present invention.

Finally, referring to FIG. 5, there is shown another preloaded anti-friction bearing assembly 84 embodying the present invention. As will be further explained, the main difference between this bearing and the bearing in FIG. 4 is in the raceway surface of the outer race member. The preloaded anti-friction bearing 84 includes coaxial relatively rotatable inner race 86 and outer race 88. The inner race 86 is radially segmented into two identical segments 90. The segments 90 are axially displaced with respect to each other to define the space therebetween 92. Two rows of a plurality of balls 94 are disposed in a side-by-side relationship in spaced relation between the inner race 86 and outer race 88. The inner surface of each segment 90 defining, in part, separate and independent paths for the balls 94. The balls 94 of this embodiment of the present invention may be held in place by a caging arrangement 96. Preloaded anti-friction bearing assembly 84 may also be provided with an inner enclosing ring 98 which encloses the inner race 86. The inner substantially cylindrical surface of the inner enclosing ring 98 is adapted to be attached to a shaft or other like rotating member. The pre-loaded anti-friction bearing assembly 84 is provided with a single resilient ring 100. The outer race 88 is provided with a substantially concave inner surface 102. The concave inner surface 102 defining in conjunction with the segments 90 an infinite number of paths for balls 94. The segments 90 are provided with support extensions 104 which extend to the inner sidewalls of the inner enclosing ring 98 of the inner race segments 90 are therefore provided with a degree of operational support by the extensions 104 and by the resilient ring 100. Thus the bearing assembly 84 may be described as a single preloaded double or multi-row angular contact bearing. Additionally, the bearing assembly 84 is capable of withstanding exceptionally high degrees of shaft misalignment without any appreciable loss of efficiency.

As mentioned and as should be obvious from the above description, the degree of hardness of the resilient ring or rings, the width of the gap between the race segments, the selection of the particular raceway surfaces of the inner or outer races, the length or extent of the support extensions, will all have an effect on the degree of preload on the bearing assemblies of FIGS. 1 through 5 inclusive. Accordingly, the present invention will enable one to precisely adapt the bearing assembly of the present invention to his particular need and environment.

It will also be obvious from the above description that the bearing assembly in accordance with the present invention as depicted in the drawings will be particularly adaptable to automobile steering column, radial arm saw guide and washing machine applications. It should be apparent, therefore, that the bearing assembly embodying the present invention will be highly adaptable for a large number of applications and that the above-described embodiments are shown by way of example and described in detail without attempting to show all the various forms and modifications in which this invention might be embodied, the invention being measured by the appended claims and not the details of the specification.

I claim:

1. A preloaded anti-friction bearing assembly unit comprising coaxial relatively rotatable inner and outer grooved races, a plurality of balls disposed in spaced relation between said inner and outer races, said outer race being radially segmented, said segments being axially displaced with respect to each other and each segment being of such uniform thickness, at least one of said segments being preloaded by preloading means to thereby exert a preloading force against said balls, said preloading means including at least one substantially noncompressible, flowable, resilient ring, an outer enclosing ring enclosing said outer race and coaxial with said races, said enclosing ring supporting said resilient rings.

2. A preloaded anti-friction bearing assembly in accordance with claim 1 wherein there is one substantially noncompressible, flowable, resilient ring exerting a preloading force on one of said segments of said outer race.

3. A preloaded anti-friction bearing assembly in accordance with claim 2 wherein said outer enclosing ring holds at least one of said segments stationary.

4. A preloaded anti-friction bearing assembly in accordance with claim 3 wherein one of said segments is held stationary, the other of said segments being held in its assembled position by the preloading force of said ring.

5. A preloaded anti-friction bearing assembly in accordance with claim 1 wherein there is a full complement of balls disposed between said inner and outer races.

6. A preloaded anti-friction bearing assembly in accordance with claim 1 wherein said balls are in the line contact with said segments.

7. A preloaded anti-friction bearing assembly in accordance with claim 1 wherein the raceway surfaces of each of said races are of uniform cross section in planes radially of said races so as to define a toroidal space between said races, said balls being disposed in said toroidal space and being in full race curvature contact with said raceway surfaces of said races.

8. A preloaded anti-friction bearing assembly in accordance with claim 1 wherein said segments have a substantially "Y" cross section in a plane radially of said races, said balls being in line contact with said raceway surfaces of said races formed by said segments.

9. A preloaded anti-friction bearing assembly in accordance with claim 1 wherein said ring is oil resistant Buna "N" rubber.

10. A preloaded anti-friction bearing assembly in accordance with claim 9 wherein said ring is molded in place.

* * * * *